Dec. 27, 1960  E. F. BRUNING  2,966,371
LONGITUDINALLY YIELDABLE COUPLING
Filed Aug. 30, 1957  2 Sheets-Sheet 1

INVENTOR
Earl F. Bruning,
BY Parker and Welsh.
ATTORNEYS

Dec. 27, 1960
E. F. BRUNING
2,966,371
LONGITUDINALLY YIELDABLE COUPLING
Filed Aug. 30, 1957
2 Sheets-Sheet 2
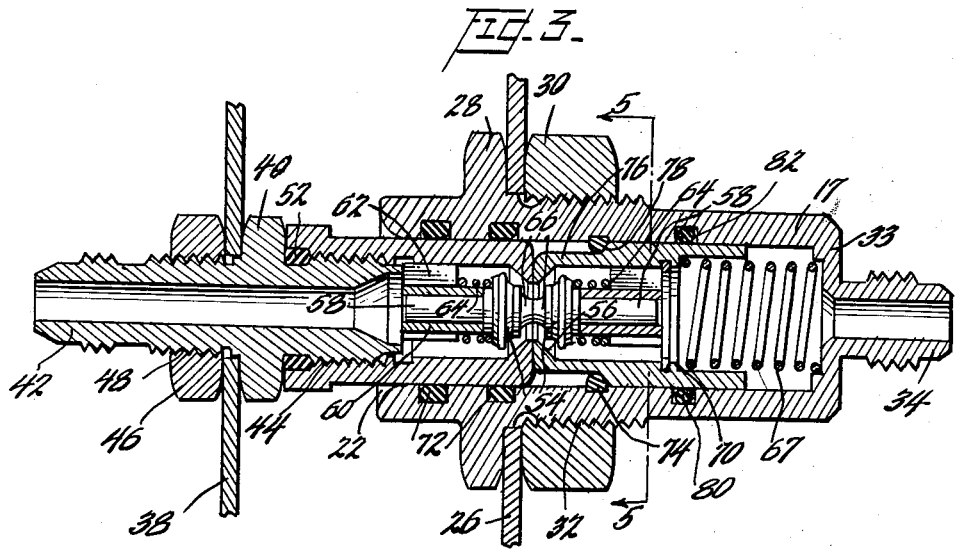
INVENTOR
Earl F. Bruning
BY Parker and Walsh.
ATTORNEYS United States Patent Office 2,966,371
Patented Dec. 27, 1960

2,966,371
LONGITUDINALLY YIELDABLE COUPLING
Earl F. Bruning, 601 S. 9th St., Lincoln, Nebr.
Filed Aug. 30, 1957, Ser. No. 681,243
5 Claims. (Cl. 284—19)

This invention relates to a fluid coupling and more particularly to a coupling that is longitudinally yieldable so as to adjust itself to compensate for differences in the spacing of supports for the coupling parts.

In my prior patents, No. 2,512,999, issued June 27, 1950 and No. 2,666,656, issued January 19, 1954, I disclose fluid couplings of the type having a female coupling part and a pair of opposed male coupling parts in the form of nipples, each nipple containing a valve which opens automatically when the coupling parts are brought into fluid coupling relationship and which closes automatically when the parts are uncoupled. The couplings of my prior patents have been found to be highly advantageous within their respective fields of intended use. More recently, however, a need has arisen for fluid couplings, the parts of which may be mounted on separate supports and which will couple automatically and properly when the supports are brought together, notwithstanding the fact that the final spacing of the supports may vary considerably. The present invention provides such a coupling.

Accordingly, it is a principal object of the invention to provide an improved and longitudinally yieldable fluid coupling.

Another object of the invention is to provide a fluid coupling of which the parts may be mounted on separate supports, which may have a range of spacings with the parts maintained in fluid coupling relationship.

A further object of the invention is to provide a fluid coupling of the aforesaid type in incorporating valve means opened automatically when the parts are coupled and closed automatically when the parts are uncoupled.

Yet another object of the invention is to provide a fluid coupling of the last-mentioned type in which the valve means is closed under the bias of a valve spring and in which the yieldability of the coupling results from the use of an adjusting spring which biases certain coupling parts toward each other.

An additional object of the invention is to provide a fluid coupling of the type just recited wherein opening of the valve means against the bias of the valve spring is ensured prior to movement of the adjusting spring.

Yet another object of the invention is to provide a fluid coupling of the aforesaid type incorporating fluid seals which prevent the leakage of fluid past the coupling parts.

A still further object of the invention is to provide fluid couplings of the aforesaid type which may be utilized in groups to connect a plurality of fluid lines simultaneously when supports, on which the respective coupling parts are mounted, are brought together.

The foregoing and other objects of the invention and the manner in which such objects are accomplished will become more readily apparent upon consideration of the following detailed description of the invention when taken in conjunction with the accompanying drawings which illustrate a preferred embodiment of the invention and wherein:

Figure 3 is a view similar to Figure 2 illustrating the position of the parts after they have been placed in fluid coupling relationship;

Figure 4 is a view similar to Figure 3 illustrating the yieldability of the coupling to accommodate different spacings of the part supports; and Figure 5 is a transverse sectional view taken along line 5—5 of Figure 3 in the direction of the arrows.

Figure 1:
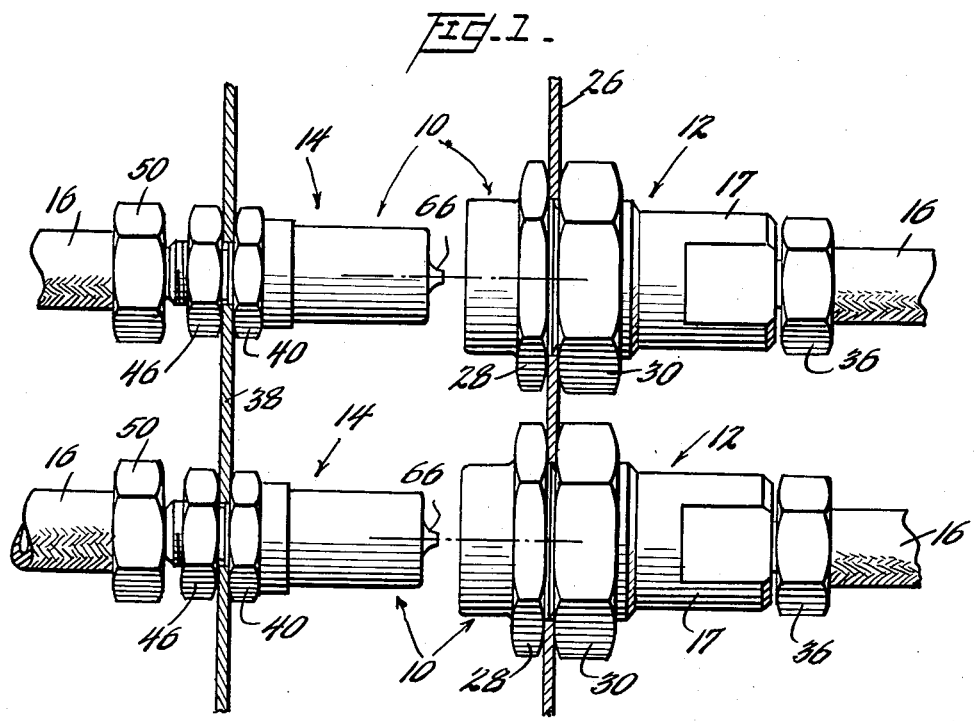
Figure 1 is a side elevation view, partly in section, illustrating the manner in which the invention is employed in the coupling of plural fluid lines simultaneously.
Figure 2:
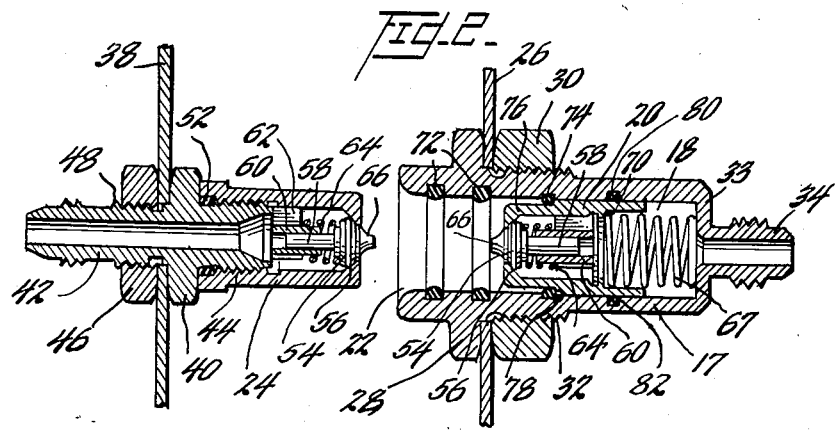
Figure 2 is a longitudinal sectional view illustrating the parts of a single coupling prior to their being placed in fluid coupling relationship.

In the construction of modern aircraft, it is often necessary to interconnect fluid lines which terminate in coupling parts supported on bulkheads which are bolted together when the corresponding sections of the aircraft are assembled. Frequently, the spacing between the opposed bulkheads is not the same or is not uniform and in order to accommodate such variations in bulkhead spacing and at the same time provide automatic coupling it would normally be necessary to provide a number of different size fluid couplings. Such a practice is uneconomical at the least and may be especially burdensome because of the fact that the spacing variations, while significant, may be relatively small. Moreover, the problem is made more complicated by the fact that the couplings must be designed so that they are closed to the passage of fluids when uncoupled and are automatically opened when coupled. This is necessary to prevent the loss of fluids in the event that the bulkheads become separated.

To solve the foregoing problem, the present invention, briefly stated, comprises a coupling having a female part which may be secured to a first bulkhead and a male part which may be secured to an opposed bulkhead. The coupling parts are adapted for connection to suitable fluid conduits and are constructed so that when the bulkheads are brought together and the coupling parts united in fluid coupling relationship, valve means incorporated in the coupling will open automatically to allow the passage of fluid through the coupling. The coupling is constructed so that once the parts have been properly coupled, the amount of insertion of the male coupling part within the female coupling part may be varied within a predetermined range so as to accommodate different final spacings of the bulkheads, yet with the parts properly coupled throughout the adjustment.

Referring now to the drawings, each coupling 10 comprises a female coupling part 12 and a male coupling part 14. The respective coupling parts are tubular and are arranged for connection to suitable fluid conduits 16 in a manner to be described. The female coupling part 12 has a casing 17 with a longitudinal or axial passage 18 containing a nipple 20, which, as will be seen, is arranged for axial movement within the casing. Casing 17 has an open end 22 flared for easy reception of the male coupling part 14, which comprises a second nipple 24. Casing 17 may be mounted in an aperture in a first bulkhead 26 through the cooperation of a hexagonal flange 28 abutting one side of the bulkhead and a hexagonal nut 30 threaded on to the outside of the casing at 32 and abutting the opposite side of bulkhead 26. The end 33 of casing 17 remote from bulkhead 26 may be provided with a threaded tubular male adapter part 34 which is arranged to be received within a complementary female adapter part 36 secured to the end of the associated fluid conduit 16.

Nipple 24 of the male coupling part may be mounted on a second bulkhead 38 through the cooperation of a hexagonal flange 40 which abuts one side of the bulkhead and is formed integrally with the tubular male adapter part 42 threaded into the nipple at 44, and a hexagonal nut 46 threaded onto the male adapter part at 48. The end of fitting 42 remote from bulkhead 38 may be threaded for reception within a female adapter part 50 secured to the associated conduit 16 as described in connection with the female coupling part 12. A fluid seal in the form of an O-ring 52 is provided between the male adapter part 42 and the complementary surface of the nipple 24 to prevent the leakage of fluid.

The coupling parts are provided with valves which are referably of the type described in my aforementioned prior patents. Each valve comprises a tapered valve head 54 and a tapered seat 56 formed at the end of and surrounding the axis of the associated nipple. The valve head is secured to the end of a valve stem 58 which reciprocates within a sleeve 60 supported within the interior of the associated nipple by a spider 62 (see Figure 5). A valve spring 64 surrounding the sleeve 60 and the valve stem 58 biases the valve head against its seat by engagement of the respective ends of the spring with the valve head and the opposed end of the spider 62.

Each valve head 54 has a tapered nose portion 66 which projects from the end of the associated nipple when the valve is closed. When the coupling parts are brought together, as shown in Figure 3, the opposed projections 66 of the respective valves engage each other, and the valve heads are forced away from their seats against the bias of the valve springs as the ends of the nipples are brought into abutting fluid coupling relationship. In this manner the valves are opened and fluid may pass through the central passageway extending through the tubular adapters and coupling parts. While in the preferred form of the invention, a valve is provided in each coupling part, it will be appreciated that each projection 66 constitutes an abutment for engaging the corresponding projection of the other valve, and within the broader aspects of the invention, one coupling part might be provided with a valve of the type described and the other coupling part provided merely with an abutment for opening the valve.

Nipple 20 within the casing 17 is biased toward the opening 22 in the casing by a compression coil spring 67. The respective ends of this spring engage the end 33 of casing 17 and an annular shoulder 70 formed in the nipple 20. Spring 67 is made substantially stronger than springs 64 so that when the projections 66 of the valve heads engage each other and the valve springs 64 commence to be compressed, there will be no movement of the adjusting spring 67 until the valves are fully open and the opposed ends of nipples 20 and 24 are in abutting relationship. Thus, as shown in Figure 3, when the bulkheads 26 and 38 are brought together and the parts coupled, the valves will open, but the adjusting spring 67 will remain in essentially relaxed condition. However, should it be necessary to move the bulkheads more closely together to place them in their final positions, further movement of the male coupling part into the casing 17 will cause the nipple 20 to move toward end 33 of the casing and compress the spring 67 therebetween. During this movement, the valves will remain open as before.

Fluid sealing devices in the form of O-rings are provided to prevent the leakage of fluid between the nipples and casing 17. Rings 72 are held within corresponding annular grooves in the inner surface of the casing 17 and surround nipple 24. Another ring 74 is held in a shallower groove so as to project appreciably into the interior of the casing 17. This ring engages the surface of a reduced portion 76 of nipple 20. The annular shoulder 78 formed at the end of this reduced portion serves as a stop for the movement of the nipple 20 toward the open end 22 of the casing 17, shoulder 78 engaging ring 74 at the limit of movement in that direction. The remainder of nipple 20 slides on the inner surface of casing 17, as does nipple 24, and the movement of nipple 20 toward end 33 of the casing is limited by the engagement of the end of the nipple with the end of the casing.

An additional O-ring 80 may also be provided within an annular groove 82 formed in the inner surface of the casing 17. The O-ring 80 surrounds the outer wall of the enlarged portion of nipple 20 in such manner as to form a fluid-tight seal between the latter and casing 17. Although this additional O-ring 80 is not required where the coupling is intended for low pressure air application such that slight leakage in the uncoupled position is of relatively no consequence, it is necessary when the coupling is employed for liquid operation or in any case where no leakage is permissible. It is to be understood that the various O-rings described above may be made of different materials depending upon the pressures to be encountered within the system, particularly in the uncoupled position. Thus, for example, the O-ring 74 may be made of a synthetic rubber or plastic material or even of metal, depending upon the conditions of use of the coupling.

From the foregoing description of the invention it will be apparent that the couplings may be associated in groups, as shown in Figure 1, so as to connect a plurality of fluid conduits simultaneously when the coupling supports or bulkheads are brought together. By virtue of the range of longitudinal yieldability incorporated within the device of the invention, a single coupling type may be utilized to accommodate different bulkhead spacings, and this is true whether the differences occur between different pairs of bulkheads or within the normal spacing tolerances of a single pair of bulkheads. The construction of the invention maintains proper fluid coupling during movement of the bulkheads within the range of adjustability and ensure that the fluid lines will be closed in the event that the bulkheads move part beyond this pre-determined range. Thus, loss of fluids which would occur if the bulkheads were accidentally torn apart is prevented. Moreover, it should be noted that the proper operation of the invention is entirely automatic and that no outside actuation is required once the parts have simply been brought together.

While a preferred form of the invention has been shown and described, it will be apparent to those skilled in the art that modifications may be made in this form without department from the principles and spirit of the invention, the scope of which is defined in the appended claims. Accordingly, the foregoing embodiment of the invention is to be taken as illustrative rather than restrictive of the invention, and those modifications which come within the meaning and range of equivalency of the claims are included therein.

I claim:

1. A self-sealing, longitudinally self-adjusting fluid coupling comprising a female coupling member having a casing and a nipple slidably held within said casing, a male coupling member including a nipple adapted for insertion in said casing into fluid coupling relationship with the first nipple, packing means between said casing and said male nipple affording fluid-tight longitudinal movement of said male nipple in said casing, at least one of said nipples having a projection upon the portion facing its opposing nipple, a valve in said opposing nipple actuatable to open by said projection when said nipples are brought into fluid coupling relationship, and means in said casing for resiliently urging said first nipple toward the nipple of said male coupling member, whereby fluid coupling may be had with varying degrees of insertion of said male coupling member in said female coupling member.

2. A self-sealing, longitudinally self-adjusting fluid coupling comprising a female coupling member having a casing mounted on a first support and having a nipple therein movable axially thereof, a male coupling member mounted on a second support and having a nipple movable axially into said casing and into end-to-end fluid coupling relationship with the first-mentioned nipple when said supports are brought toward each other, packing means between said casing and said male nipple affording fluid-tight longitudinal movement of said male nipple in said casing, a valve in at least one of said nipples including means for closing said valve means when the nipples are not in fluid coupling relationship, means on the other nipple projecting toward said one nipple, means for holding said valve closed when said nipples are not in fluid coupling relation, said holding means being disabled by said projecting means when said nipples are brought into fluid coupling relationship, and adjusting spring means in said casing for resiliently urging the first-mentioned nipple toward the nipple of the male coupling member.

3. The coupling of claim 2, wherein said valve is biased to its closed condition by a valve spring, said adjusting spring means being stronger than said valve spring, whereby said valve spring is moved to open said valve before said adjusting spring means is moved.

4. The coupling of claim 2, including fluid seals between said nipples and said casing.

5. A self-sealing, self-adjusting fluid coupling comprising, a female coupling member having a casing with a nipple mounted therein for limited movement along the axis of said casing, said casing having an open end for receiving a male coupling member, an adjusting spring in said casing resiliently biasing said nipple toward said open end, a male coupling member having a nipple arranged for insertion in said casing and into end-to-end fluid coupling relationship with the first-mentioned nipple, means for coupling a fluid conduit to each of said nipples, fluid seals between said nipples and said casing, a valve in each said nipples, each valve having a valve seat, a valve body movable axially of the nipple to engage and disengage said valve seat, and a valve spring resiliently biasing the valve body against its seat, each valve body having an operating projection extending from its nipple to engage the corresponding projection of the other valve body when said nipples are brought into fluid coupling relationship, and separate supports for said male and female coupling members, said adjusting spring being stronger than said valve springs, whereby when said supports are brought together and said valve members coupled, said valves will open before said adjusting spring is moved to accommodate different distances between said supports.

References Cited in the file of this patent
UNITED STATES PATENTS

| | | |
|---|---|---|
| 2,083,591 | Barks | June 15, 1937 |
| 2,305,841 | Carlson | Dec. 22, 1942 |
| 2,666,656 | Bruning | Jan. 19, 1954 |
| 2,729,471 | Fraser | Jan. 3, 1956 |
| 2,735,696 | Omon et al. | Feb. 21, 1956 |
| 2,765,181 | Butterfield | Oct. 2, 1956 |

FOREIGN PATENTS

| | | |
|---|---|---|
| 480,241 | Great Britain | Feb. 14, 1938 |